Aug. 12, 1969 W. E. FRANKLIN 3,460,850
SHOPPING CART

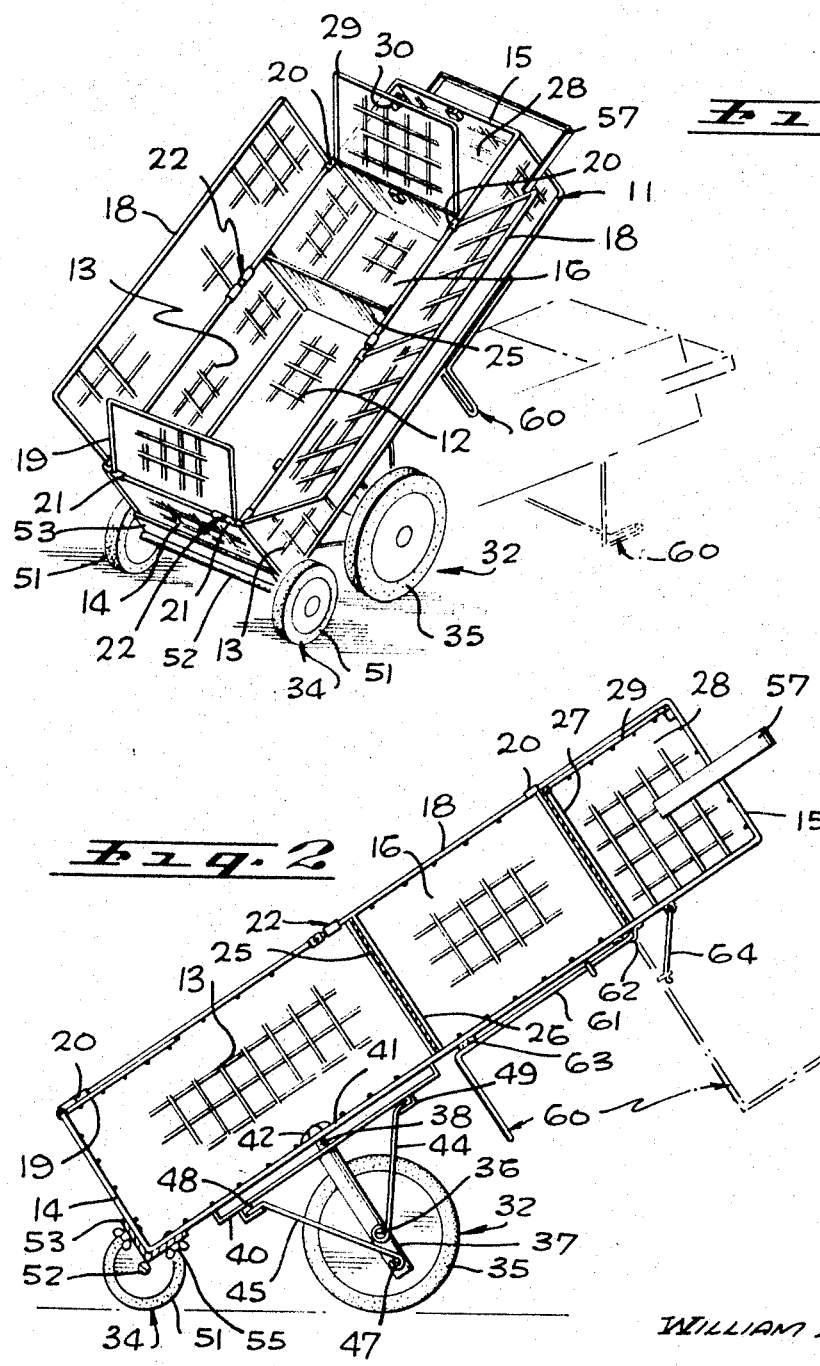

Filed April 10, 1967 2 Sheets-Sheet 2

WILLIAM E. FRANKLIN
INVENTOR.

BY Mason & Graham
ATTORNEYS 3,460,850
SHOPPING CART
William E. Franklin, 1451 E. 56th St.,
Los Angeles, Calif. 90011
Filed Apr. 10, 1967, Ser. No. 629,457
Int. Cl. B62b *1/00, 7/04*
U.S. Cl. 280—47.2                    1 Claim

ABSTRACT OF THE DISCLOSURE

The application discloses a cart suitable for shopping which is provided with two sets of removable wheels and with side wall extensions that fold over the main compartment body and an auxiliary locking compartment.

---

This invention has to do with carts of a type that are particularly suitable for use as shopping carts and for general usage by a housewife.

An object of the invention is to provide a novel and improved cart designed for ownership by the housewife and one which she can take to and from the store, laundramat, or the like to carry groceries and other items and so designed that it is easy to handle and can readily be manipulated over uneven terrain, such as up and down curbs.

Another object of the invention is to provide such a cart having a set of main wheels designed to be used in wheeling the cart from point to point together with a set of auxiliary wheels which are employed when the cart is standing alone or for use in negotiating curbs and the like.

A further object of the invention is to provide a shopping cart-type of device that may be used conveniently with an automobile and for this purpose has removable wheels to enable a person to place the device in an automobile.

Still another object of the invention is to provide a shopping cart having hinged side wall extensions that may be used either in a position overlying objects in the cart to retain them, or as vertical extensions of the side walls to provide greater capacity.

A further object is to provide a shopping cart or the like having a lockable compartment in which valuables can be kept.

These and other objects will be apparent from the drawings and the following description. Referring to the drawings:

FIG. 1 is an isometric view of a shopping cart embodying the invention;

FIG. 2 is a longitudinal sectional view of the cart of FIG. 1, but on a larger scale;

Figure 3:
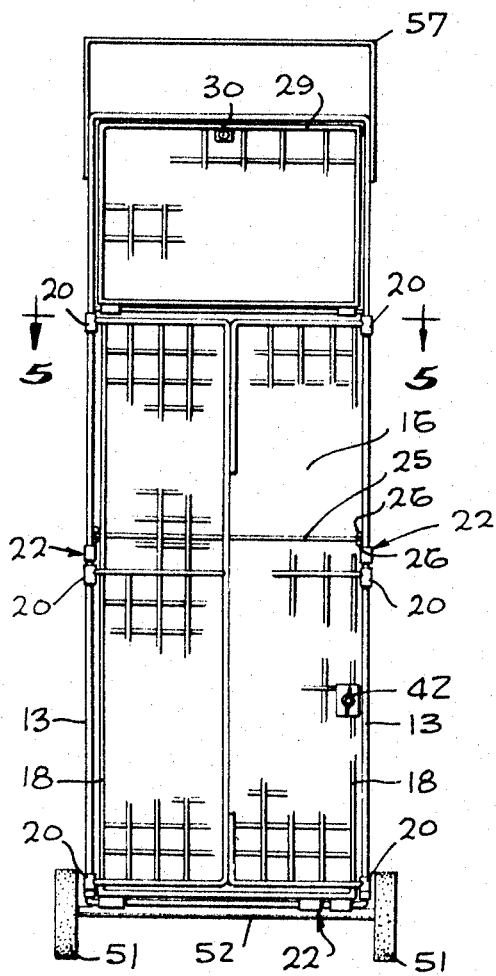
FIG. 3 is a plan view of the cart of FIG. 2, but with portions broken away.
Figure 4:
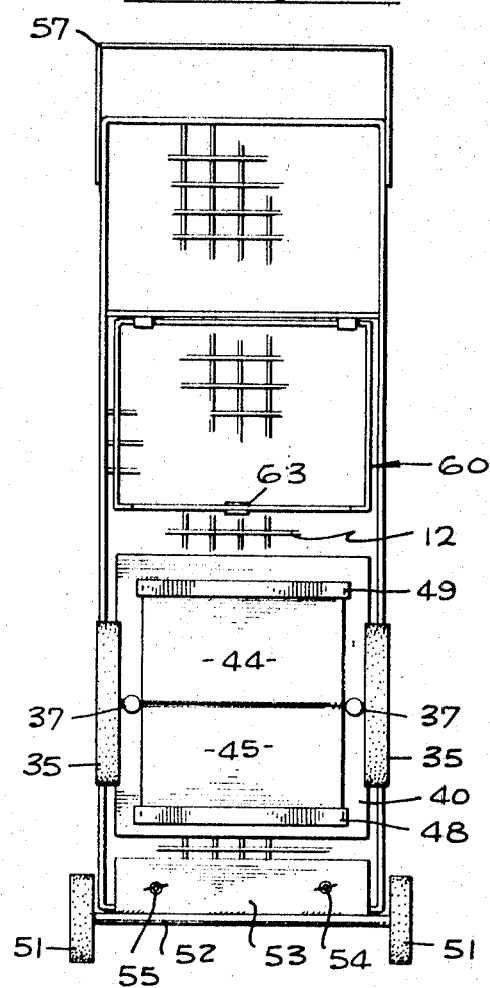
FIG. 4 is an inverted plan view of the device of FIG. 2.
Figure 5:
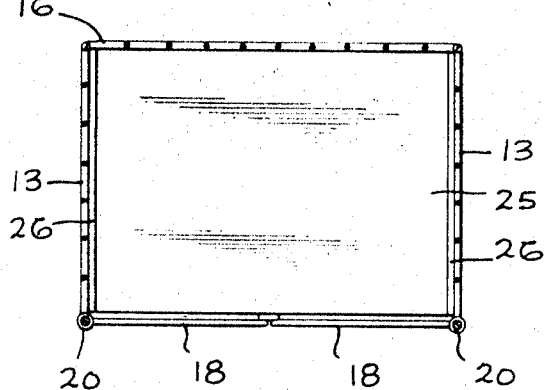
FIG. 5 is a cross sectional view on line 5—5 of FIG. 3.
Figure 6:
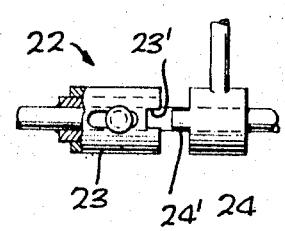
FIG. 6 is a face view, partly in section, of a latch on a side wall extension.

More particularly describing the invention, numeral 11 generally designates the container body of the device which is shown as generally rectangular and formed of a heavy gauge large- or open-mesh wire such as is common in shopping carts. The body includes a bottom wall 12, the two parallel side walls 13, a lower end wall 14, and an upper end wall 15. The body has an open-topped main compartment 16, although this may be closed by means of wings or extensions 18 on the side walls and the extension 19 on the lower end wall. The side wall extensions are hingedly mounted at 20 and the lower extension at 21. Each extension is preferably provided with a latch 22 of a type which is manually releasable and effective to releasably hold the extensions either upright or horizontal over the body 11. Such a latch may comprise a sleeve 23 on the body wall slideable to engage a boss 24 on the extension and receive a projection 24′ in a recess 23′, as shown in FIG. 6, although other types of latches might be used.

Preferably the main compartment space within the body is optionally partitionable by means of a removable partition 25 that is slideable in guides 26 provided on the side walls. The upper end of the body is divided off by wall 27 to form an enclosed valuable compartment 28 which is covered by a hingedly mounted cover 29 that may be secured by means of a lock 30. Thus a woman using the cart may place her purse or other valuables in this compartment and lock the cover when leaving the cart unattended.

It is a feature of the invention that the body normally is supported inclined at an angle to the ground upon two sets of wheels, namely, a main set 32 and an auxiliary set 34. The main set comprises wheels 35 mounted on an axle 36 which is supported in posts 37 that are detachably secured to the lower wall of the body by studs 38 at the ends of the posts. The studs extend through appropriate holes in a subfloor 40 and floor plates 41 and are held by wing nuts 42. The posts are braced by metal plates 44 and 45 that are pivotally mounted at their inner edges on axle 36 and a rod 47, respectively, extending between the posts 37 and have their outer edge portions received in channels 48 and 49, respectively, provided on subfloor 40.

The auxiliary set of wheels 34 comprises wheels 51 mounted on an axle 52 which in turn is secured to a right angle mounting bracket 53 that is detachably mounted on the forward edge of the body by screws 54 and wing nuts 55.

Normally the cart stands, as shown in FIGS. 1 and 2. However, when wheeled it is tilted downwardly at the back slightly by grasping a handle 57 provided thereon so that it stands on only its main wheels. However, the auxiliary set of wheels 34 can be used in negotiating curbs and the like. Where it is desired to have the body disposed more nearly parallel to the ground or supporting surface, a stand 60 is swung down to the broken-line position of FIGS. 1 and 2, and the cart tilted back to rest thereon. The stand comprises a generally U-shaped heavy gauge wire rod 61 supported in brackets 62 and normally held up and out of the way by a suitable clamp 63. A hook 64 on the body cooperates with an eye on the stand to secure the stand when down.

It will be apparent that when it is desired to place the cart in an automobile, either or both sets of wheels can be readily removed to make this easier.

Although I have illustrated and described a preferred form of my invention, I contemplate that various changes and modifications can be made therein without departing from the invention, the scope of which is indicated by the following claim.

I claim:

1. In a shopping cart of the wire mesh type or the like, an open-top body having a front end and a back end, a set of relatively large main wheels detachably mounted on the body therebeneath at a region adjacent but spaced rearwardly of the front end thereof, and a set of relatively small auxiliary wheels on the body at the front end thereof, said set of main wheels extending substantially below said body and below said set of auxiliary wheels whereby said body stands on said main and auxiliary wheels at an inclined angle with respect to the supporting surface on which the wheels may stand, said set of main wheels being carried on a pair of posts having studs at their upper ends received in holes in said body, nuts on the studs releasably securing the posts, and braces provided on the posts removably received in channels on the bottom of the body.

References Cited

UNITED STATES PATENTS

| 1,407,690 | 2/1922 | Berry | 280—47.16 |
| 1,969,048 | 8/1934 | Smith | 280—5.32 |
| 1,970,727 | 8/1934 | Bates | 280—47.26 |
| 2,964,328 | 12/1960 | Muir | 280—47.26 X |

BENJAMIN HERSH, Primary Examiner

R. R. SONG, Assistant Examiner

U.S. Cl. X.R.

220—19; 280—47